US009886482B2

(12) United States Patent
Bendel et al.

(10) Patent No.: US 9,886,482 B2
(45) Date of Patent: Feb. 6, 2018

(54) DATA MANAGEMENT SYSTEM WITH STORED PROCEDURES

(71) Applicant: International Business Machines Corporation, Armonk, NY (US)

(72) Inventors: Peter Bendel, Holzgerlingen (DE); Nicole Y. Finnie, Boeblingen (DE); Christian W. Hoerst, Boeblingen (DE); Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/180,398

(22) Filed: Jun. 13, 2016

(65) Prior Publication Data

US 2016/0342654 A1 Nov. 24, 2016

Related U.S. Application Data

(63) Continuation of application No. 14/715,662, filed on May 19, 2015.

(51) Int. Cl.
*G06F 17/30* (2006.01)
*G06F 21/62* (2013.01)

(52) U.S. Cl.
CPC .... *G06F 17/30463* (2013.01); *G06F 17/3051* (2013.01); *G06F 17/30575* (2013.01); *G06F 17/30592* (2013.01); *G06F 21/6218* (2013.01); *G06F 21/6236* (2013.01)

(58) Field of Classification Search
CPC .......... G06F 17/30463; G06F 17/3051; G06F 17/30575; G06F 17/30592; G06F 21/6218; G06F 21/6236
See application file for complete search history.

(56) References Cited

U.S. PATENT DOCUMENTS

| 7,752,230 B2 | 7/2010 | Bland et al. |
| 8,453,255 B2 | 5/2013 | Shulman et al. |
| 8,825,604 B2 | 9/2014 | Draese et al. |

(Continued)

OTHER PUBLICATIONS

IBM Appendix P, list of patents and patent applications treated as related, Jun. 8, 2016, 2 pages.

(Continued)

*Primary Examiner* — Jay Morrison
(74) *Attorney, Agent, or Firm* — Steve F. McDaniel

(57) ABSTRACT

A method includes storing a first stored procedure in a first database management module and a second stored procedure in a second database management module, receiving by the first database management module a request to run a computational task with the first stored procedure, receiving a request to perform the computational task and in response thereto causing a first query optimizer in the first database management module to automatically compute a query execution plan for the first stored procedure, using the query execution plan to identify all first data containers on the first database management module that provide input data for the requested computational task, identifying a list of names of all second data containers mapped to the identified first data containers, and performing the second stored procedure using the list of names. A corresponding computer program product and data management system are also disclosed herein.

12 Claims, 3 Drawing Sheets

(56) References Cited

U.S. PATENT DOCUMENTS

2006/0271511 A1    11/2006  Harward et al.
2007/0214104 A1*    9/2007  Miao ................. G06F 17/30463
2012/0259843 A1    10/2012  Child
2012/0317134 A1*  12/2012  Bourbonnais ..... G06F 17/30371
                                                            707/769

OTHER PUBLICATIONS

IBM, "IBM® Netezza® Analytics Release 3.0.1.0"—In-Database Analytics Developer's Guide, Revised: Mar. 31, 2014, pp. 1-329, IBM®.
Bendel et al., "Data Management System With Stored Procedures", U.S. Appl. No. 14/715,662, filed May 19, 2015, 59 pages.

* cited by examiner

DATA MANAGEMENT SYSTEM WITH STORED PROCEDURES

BACKGROUND

The present invention relates to database management systems, and more specifically, to database management systems comprising stored procedures.

Managing large data volumes and OLTP (online transactional processing) as well as OLAP (online analytical processing) queries that are performed on data volumes has become a major factor for data warehouse design. Often, OLTP queries perform better on database tables of a particular structure that may be unsuited for efficiently performing OLAP queries and vice versa. To overcome the problems associated with different kinds of database queries requiring different data structures, systems have been developed which comprise two or more database management systems (DMBSs) with differently structured database tables. The data of one of the databases is—partially or completely—synchronized with the data of the one or more other databases of the system.

In the above mentioned systems, there may exist queries which can be performed more quickly on the source DBMS while other queries can be performed more quickly on one of the other DBMSs of the system. Some of the queries may be implemented as stored procedures of the source DBMS while other queries may be implemented as stored procedures in one of the other DBMSs. A problem associated with this situation that a client may need to "know" in which one of the DBMSs a particular query has the minimum execution time in order to direct the query to the appropriate DBMS or may need to "know" in which one of the DBMSs of the system a respective stored procedure is implemented for calling the stored procedure. This may lead to a tight coupling of client and database server and thus to a significantly increased maintenance costs.

Dynamically dispatching a query from one DBMS of the system to the other is often not possible due to the complexity of the query and due to significant deviations in respect to the table structure and database-internal functions of the two different DBMSs.

SUMMARY

In one aspect of the present invention, one embodiment of a method includes storing a first stored procedure in a first database management module, storing a second stored procedure in a second database management module, receiving by the first database management module a request to run a computational task with the first stored procedure, receiving a request to perform the computational task and in response thereto causing a first query optimizer in the first database management module to automatically compute a query execution plan for the first stored procedure, using the query execution plan to identify all first data containers on the first database management module that provide input data for the requested computational task to provide identified first data containers, identifying a list of names of all second data containers mapped to the identified first data containers, and performing, by the second database management module, the second stored procedure using the list of names A corresponding computer program product is also disclosed herein.

In a further aspect, one embodiment of a data management system includes a first database management module comprising a first query optimizer, first data containers and a first catalogue with first metadata, the first metadata being descriptive of the structure of the first data containers, the first database management module further comprising a first stored procedure, the first stored procedure being assigned to a computational task and being configured to read input data from one or more of the first data containers, and a second database management module comprising a second query optimizer, second data containers and a second catalogue with second metadata, the second metadata being descriptive of the structure of the second data containers, the second database management module further comprising a second stored procedure for calculating the same result in the second database management module, the second stored procedure being configured to read input data from one or more of the second data containers, the second stored procedure being configured for performing the computational task and lacking a specification of the names of at least one of the one or more ones of the second data containers comprising the input data for the second stored procedure. The data management system may also include a synchronization-mapping specifying from which of the first data containers data is transferred to which of the second data containers in a synchronization process between the first and the second database management module, wherein at least one of the first data containers is an unsynchronized first data container. The first database management module may be configured to conduct a method that includes receiving a request to perform the computational task, and in response to receiving the request causing the first query optimizer to automatically compute a query execution plan for the first procedure assigned to the requested computational task, and using the query execution plan to identify all first data containers that provide input data for the requested computational task, thereby either resolving the at least one unsynchronized first data container to one or more other first data containers from which the at least unsynchronized first data container is configured to retrieve input data, each of the other first data container being a synchronized first data container, or triggering the second database management module to create a new second data container in accordance with information on the unsynchronized first data container in the query execution plan, the new second data container being structurally identical to the at least one unsynchronized first data container. The method may also include evaluating the synchronization mapping for identifying a list of names of all second data containers mapped to the identified and synchronized first data containers, and performing the second stored procedure, wherein the second stored procedure uses the list of names of the identified second data containers for identifying the second data containers comprising the input data, and reading the input data from the identified second data containers.

The above system, method, and computer program product have the advantage that highly complex calculations implemented in a stored procedure can dynamically be dispatched from one database management module (DBMM) where the procedure may have been specified or executed originally to another DBMM which may be better suited for computing the task. The dispatching may even be possible in case the first stored procedure accesses a first data container, e.g. a view, which does not exist in the other DBMM to which the stored procedure is dispatched or which is, for other reasons, not synchronized with a data container of the other DBMM. The query execution plan of the first stored procedure may dynamically be resolved to synchronized first data containers and corresponding second data containers such that the execution of the computational task may be dynamically dispatched to and executed in the second DBMM. Information contained in the query execution plan thus may not be used for planning a query in the first DBMM but rather for resolving unsynchronized data containers to synchronized data containers and/or for creating a new second data container in the second DBMM which is structurally identical to the unsynchronized first data container, thereby enabling the execution of the computational task by a second stored procedure in the second DBMM. This may prevent a tight coupling of a client system and the data management system as the client system does not need to know or to decide if the requested computational task shall be executed in the first and/or second DBMM. The data management system may automatically perform actions, e.g. resolve such unsynchronized data containers to synchronized data containers or automatically create identically structured data containers in the second DBMM which may ensure that the computational task may be dispatched to and executed in the second DBMM.

BRIEF DESCRIPTION OF THE DRAWINGS

In the following embodiments of the invention are explained in greater detail, by way of example only, making reference to the drawings in which.

DETAILED DESCRIPTION

Figure 1:
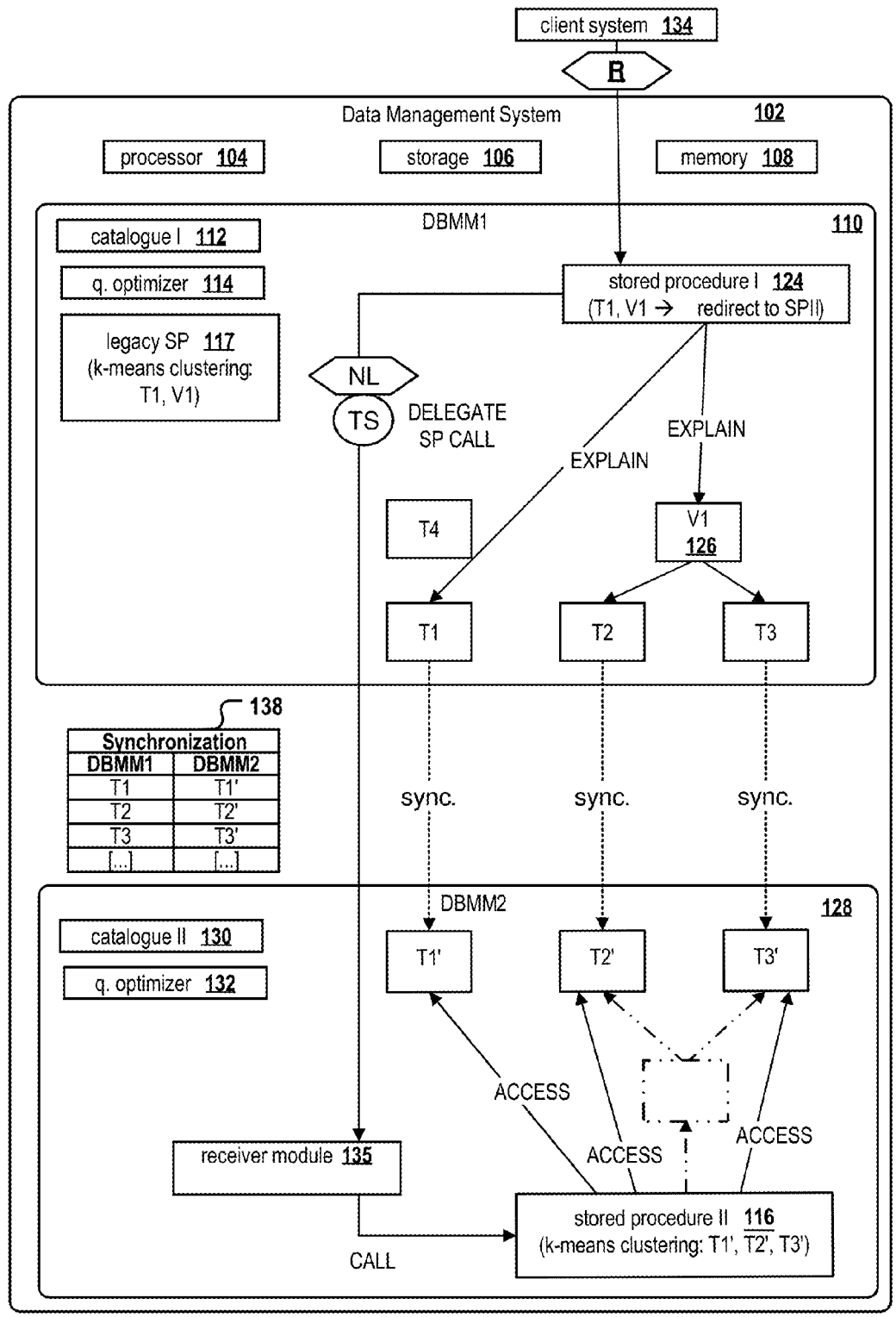
FIG. 1 depicts a data management system according to an embodiment of the present invention.

A "data management system" as used herein is a data processing system comprising at least a first DBMM and one or more second DBMMs, whereby at least a fraction of the data of the first DBMM is transferred to the one or more second DBMMs for synchronizing the data fraction of the first DBMM with the data of the second DBMM(s). In some embodiments, the first DBMM is speed-optimized for other types of queries than the second DBMM(s). For example, the first DBMM may be an OLTP system and the second DBMM(s) may be an OLAP system. For example, the first DBMM may be DB2 for z/OS and at least one second DBMM, e.g. the "analytics accelerator" for DB2. In some embodiments, the first and second DBMMs are of the same type, e.g. an OLTP database management system (DBMS), and OLAP DBMS, a graph based DBMS, a triple store, a columnar DBMS or the like. It is also possible that the first and second DBMMs are implemented as in-memory databases. The data management system may be a federated DBMS system wherein at least a fraction of the data of the first DBMM is transferred to the one or more second DBMMs. In some embodiments, the first DBMM is not able to access the second catalogue of any one of the second DBMM and no second DBMM is able to access the first catalogue of the first DBMM.

According to embodiments, each of the first and second DBMMs is a database management system (DBMS), i.e., an application such as, for example, DB2, Oracle, MySQL or the like. In this case, the first and second DBMMs can be hosted on the same computer system or on different computer systems connected to each other via a network. In this case, the data management system can be implemented in the form of a distributed system, e.g. a distributed federated DBMS. For example, the first DBMM could be an OLAP-DBMS, an OLTP-DBMS, a graph-based DBMS, a triple-store-DBMS, a key-value ("correlation")-DBMS, a document-based DBMS, a row-oriented DBMS, a column-oriented DBMS and the second DBMM could be any other one of the DBMS-types. A "column oriented"-DBMS is a DBMS that stores data tables as sections of columns of data rather than as rows of data by serializing all of the values of a column together, then the values of the next column. A "row oriented"-DBMS is a DBMS that stores data tables as sections of rows of data rather than as columns of data by serializing all of the values of a row together, then the values of the next row.

According to other embodiments, the data management system is a single database management system and each of the first and second DBMMs is a functional sub-module of the single database management system, whereby at least one of the first and second DBMMs is not capable of operating on its own. The functional sub-modules may, for example, lack an interface that would enable a client to directly submit a query to one of the sub-modules. The first DBMMs is configured for managing first data containers being organized in accordance with a first storage format, e.g. a row-store format, and each of the one or more second DBMMs is configured for managing second data containers, the second data containers being organized in accordance with a different, second storage format, e.g. a column-store data format. For example, all or most of the first data containers could be organized in row-major order and all or most of the second data containers could be organized in column-major order. The first query optimizer is configured for computing efficient query execution plans for tables in row-major order and the second query optimizer is configured for computing efficient query execution plans for tables in column-major order. Row-major order and column-major order describe methods for arranging multidimensional arrays in linear storage such as memory. In row-major order, consecutive elements of the rows of the array are contiguous in memory. In column-major order, consecutive elements of the columns are contiguous. Array layout is important for performance when traversing an array because accessing array elements that are contiguous in memory is usually faster than accessing elements which are not, due to caching.

An "accelerator system" or "accelerator" as used herein is a DBMM designed to allow the querying of data in a particularly fast manner. An accelerator system may be a conventional DBMM coupled to another DBMM or may be a module or plug-in that needs to be operatively coupled to another (the "first") DBMM in order to be operable to function, e.g., to analyze data. The module or plug-in may not be usable on its own. When coupled to the other DBMM, e.g. a "first DBMM", the accelerator system is configured to act as an "accelerator" of the first DBMM, because it is capable of processing at least some kinds of database queries quicker than the first DBMM.

A "database management system" (DBMS) is an application designed to allow the definition, creation, querying, update, and administration of databases having one or more different storage formats. A DBMS as used herein is an application. It is a self-contained executable that can be saved to a customer's computer and launched directly, or is an executable that needs to be installed before it can be launched. A storage format defines the manner how data stored in and managed by the DBMS is stored. Examples for storage formats are "column-major" and "row-major" storage format.

A "database management module" (DBMM) is a system designed to allow the definition, creation, querying, update, and administration of one or more databases of one particular storage format. A DBMM as used herein comprises its own query optimizer and its own catalogue.

A "database" as used herein is an information structure which comprises one or more data containers, whereby the use of the data containers is controlled by a database management module. The "use" may comprise, for example, reading data from a data container, storing data in a data container, manipulating or evaluating the structure of a data container or planning query execution on multiple ones of the data containers. The database may be a relational database, an object oriented database, or any other kind of database. Accordingly, the DBMM may be a relational DBMS, an object oriented DBMS, an OLAP DBMS, an OLTP DBMS, or any other kind of DBMS.

A "catalogue" or "database catalogue" as used herein is a component of a database management module that comprises metadata in which definitions of database objects such as data containers such as base tables and views, synonyms, value ranges, indexes, users, user groups, user- and group-specific permissions, stored procedures and/or user defined functions are stored. According to preferred embodiments, the catalogue is accessible by a uniform SQL standard called the INFORMATION_SCHEMA, but there exist also database-specific metadata access methods, e.g. for Oracle databases. A catalog may be specific for data containers of a particular storage format.

A "stored procedure" as used herein is a subroutine available to applications that access a DBMM. A stored procedure ("SP") is typically stored in the catalogue of the DBMM. Stored procedures may be used for data validation and/or data analysis integrated into a DBMM. They can consolidate and centralize logic that was originally implemented in applications, thereby increasing performance by avoiding data traffic between the DBMM and an external application and by making use of performance-optimized database operations. Stored procedures may return result sets, may contain declared variables for processing data and cursors that allow it to loop through multiple rows in a table. The exact and correct implementation of stored procedures varies from one database system to the other. Most major database vendors support them in some form. Depending on the database system, stored procedures can be implemented in a variety of programming languages, for example SQL, Java™, C, or C++. Stored procedures written in non-SQL programming languages may or may not execute SQL statements themselves.

A "user-defined function (UDF)" is a function provided by the user of a program or environment and which is configured and designed for being integrated in an SQL statement to be performed by a DBMM comprising the UDF. An UDF is a mechanism for extending the functionality of the DBMM by adding a function that can be evaluated in SQL statements. UDFs in SQL are declared using the CREATE FUNCTION statement. UDFs can be used like any other expression within SQL statements, whereas stored procedures must be invoked using the CALL statement A "synchronization mapping" as used herein is a mapping between first data containers of a first DBMM of a data management system and second data containers of a second DBMM of the data management system. The data content of at least some of the first data containers is transferred to and thus synchronized with one or more specific second data containers. The synchronization mapping specifies which ones of the second data container receive data from which ones of the first data containers. In the synchronization mapping, each of the synchronized first data containers has assigned one or more second data containers whose data content is synchronized with the data content of the first data container.

A "table" or "base table" as used herein is a database table. It is not a view.

A "database view" as used herein is a tabular data structure including some program logic consisting of database operations to be performed by a DBMM. The program logic may consist of SQL statements capable of retrieving a result set from one or more database tables and/or further database views. A client may query a database view just in the same way as it would do for a database table. According to some embodiments, the program logic of a view is stored in the catalogue of the DBMM comprising the view.

A "query" as used herein is a read request for information from a database and/or a write request for storing data in the database. A query can comprise a SELECT, UPDATE, INSERT or DELETE statement or any combination thereof. For example, multiple SQL statements may be combined in a complex manner via JOIN clauses.

A "query optimizer" as used herein is module or function of a database management module, the module or function being configured for determining the most efficient way to execute a given query by considering possible query execution plans for the database management module. In many cases, the query optimizer cannot be accessed directly by a client: once queries are submitted to the data management system, delegated to a particular DBMM of the data management system, and parsed by a parser of the DBMM, they are then passed to the query optimizer of the DBMM where optimization occurs. The data of a DBMM that is relevant for a query can be accessed in different ways, through different data-structures, and in different orders, whereby different ways typically require different processing times. Processing times of the same query may have large variance, from a fraction of a second to hours, depending on the way selected. A query optimizer as used herein is a DBMM module or function configured to automatically identify the way to process a given query within the DBMS in minimum time, whereby the identification may be implemented, for example, by means of heuristics which are capable of identifying in a reasonable time a "fast enough" plan which typically does not deviate much from the best theoretically identifiable result. Different DBMM can have different query optimizers which respectively assign an estimated "cost" to each possible query execution plan, and choose the plan with the smallest cost. Costs are used to estimate the runtime cost of evaluating the query, in terms of the number of I/O operations required, CPU path length, amount of disk buffer space, disk storage service time, and interconnect usage between units of parallelism, and other factors determined from the data dictionary. The set of query execution plans examined can for example be formed by examining the possible access paths (e.g., primary index access, secondary index access, full file scan) and various relational table join techniques (e.g., merge join, hash join, product join). The search space can become quite large depending on the complexity of the SQL query. Often, the performance of a query execution plan is determined by the order in which the tables are joined. The query may be a nested SQL query, i.e., an SQL query nesting several layers of SPJ blocks (Select-Project-Join), by means of group by, exists, and not exists operators. In some embodiments the query optimizer is configured to flatten a nested query into a select-project-join query.

According to some embodiments of the invention, the data management system is a single DBMS comprising a first query optimizer and one or more second query optimizers. The first and each of the second query optimizers may be implemented as a module being an internal part of their respective DBMM. Alternatively, the data management system may comprise one central "optimizer module" integrating the functionality of the first and each of the second query optimizers, whereby the data management system uses the first query optimizer functionality for computing query execution plans for the first data containers in the first DBMM and uses the functionality of one of the second query optimizers for computing a query execution plan for the respective second DBMM.

A "schema definition" as used herein is the definition of the structure of a data container, e.g. a database table, the definition being provided in a formal language supported by the database management module (DBMM). In a relational database, a schema definition specifies the table name, the columns contained therein and the relationships between columns and tables. According to embodiments, the query execution plan comprises, for each first data container that would be accessed upon execution of the first stored procedure, schema definition information of the first data container.

The expression "resolving the at least one unsynchronized first data container to one or more other first data containers from which the at least unsynchronized first data container is configured to retrieve input data" may imply, for example, that structural and or functional metadata of the unsynchronized first data container is evaluated for determining one or more other first data containers from which the unsynchronized data container, e.g. a view, dynamically retrieves input data upon being queried.

A "data container" as used herein is a data structure used for storing and/or dynamically retrieving data in a structured manner A data container may be a database table, a materialized view or a "conventional", non-materialized database view. A "synchronized first data container" is a data container of a first DBMM having assigned in a synchronization mapping one or more second data containers of a second DBMM which receive data from the first data container in a synchronization process. An "unsynchronized first data container" is a data container of a first DBMM not having assigned one or more second data containers of a second DBMM to receive data from the first data container in a synchronization process. Preferentially, for an unsynchronized first data container, a structurally identical second data container in the second DBMM does not exist, at least not at design time of the data management system.

"Metadata" as used herein is data that is descriptive of some features of a data container, but is free of a description of the data that is stored in the container. For example, metadata may comprise a name such as "employee", "ID", "salary" of a data container or namespace of a data container. The metadata may comprise an indication of the number and names of the columns of a table or view and may comprise constraints of the container or individual columns of the container, e.g. unique constraints, foreign key constraints, default values for particular columns, a specification of the type or maximal size of data to be stored in a particular column, or the like.

Embodiments of the invention may have the advantage that highly complex calculations which are typically implemented by means of a stored procedure can dynamically be dispatched from one DBMM where the function may have been specified or executed previously to another DBMM which may be better suited for computing the task. The dispatching may even be possible in case the first stored procedure accesses a first data container, e.g. a view, which does not exist in the other DBMM to which the stored procedure is dispatched. The unsynchronized first data container may likewise be a database table that exists in the first DBMM, that was created from input data derived from one or more other tables or views of the first DBMM and that is not synchronized with a respective second data container. Such tables may be created temporarily in the first DBMM e.g. for storing intermediate results of a computational task. By dynamically evaluating a query execution plan provided by the first query optimizer and a synchronization mapping, such views or other kinds of non-synchronized data structures may dynamically be resolved to data containers such as base tables which can be resolved to respectively mapped data containers in the second DBMM. Even in case this is not possible, the computational task may nevertheless be dynamically dispatched to and executed in the second DBMM, because the structural information (which is originally stored as metadata in the first catalogue and is also part of the query execution plan computed for the first stored procedure) of the unsynchronized first data containers that are capable of providing input data for the requested computational task can be evaluated and used for creating a structurally equivalent data container in the second DBMM. Thus, a highly flexible, easily maintainable data management system may be provided, which is capable of dispatching also complex computational tasks specified in a stored procedure and configured to access data containers that may not even exist in the second DBMM, to the second DBMM. The data management system may automatically perform actions, e.g. resolve such unsynchronized data containers to synchronized data containers or automatically create equivalent or identically structured data containers in the second DBMM which may ensure that the computational task may be dispatched to and executed in the second DBMM.

The evaluation of the synchronization mapping for identifying a list of names of all second data containers mapped to the identified first data containers may allow identifying all second data containers that have received and/or will receive data from their respectively mapped first data containers during synchronization. For example, the names of the identified first data containers may be determined by the first query optimizer by analyzing input parameters dynamically provided to the first stored procedure as an argument when calling the first stored procedure. In addition or alternatively, the names of the first data containers can be specified in the first stored procedure in SQL syntax or can be extracted from the metadata of a view accessed by the first stored procedure for retrieving input data. The storing of the first and second stored procedures may be executed during "design time" of the data management system or at a later moment in time. Multiple first stored procedures may be stored in the first DBMM and multiple second stored procedures may be stored in the second DBMM, each of the first procedures corresponding to one of the second stored procedures in that they relate to the same computational task. The computational task may be, for example, the calculation of a particular result, e.g. a clustering algorithm result or a statistical evaluation result.

In some embodiments, the first stored procedure comprises program logic, e.g. complex JOIN operations, calls to user-defined functions and the like, for performing the computational task upon execution of the first stored procedure. In this case, the first query optimizer may merely compute the query execution plan for the first stored procedure without executing the program logic contained therein. Thus, the query execution plan is solely computed and used by the first query optimizer to resolve all unsynchronized first data containers to synchronized first data containers and optionally also for doing a privileges check. The query execution plan may comprise information on the query execution path having minimum execution time, but the first DBMM ignores this information and selectively uses the supplementary information contained in the query execution plan for resolving the unsynchronized first data containers and/or for performing the checking the privileges of the client system having submitted the query.

According to other embodiments, the first stored procedure is a special form of a stored procedure, also referred to as "stub stored procedure", lacks the program logic necessary to performing the computational task assigned to the first stored procedure. The first stored procedure may in some embodiments comprise the names of the first data containers and/or user-defined functions that comprise the input data and/or that are capable of computing one or more intermediate results and that need to be accessed or called by the first DBMM for performing the computational task in the theoretical case that the computational task assigned to the first stored procedure would be carried out in the first DBMM. The special form of stored procedure lacks any complex JOIN operations or other complex program logic that is usually used by a query optimizer to predict a query execution plan with minimum execution time. This may have the advantage that the complexity of the first stored procedure is minimized and thus the maintenance effort is reduced: the special form of the first stored procedure takes advantage of the fact that the first stored procedure is not used by the first query optimizer for identifying the most efficient execution path in the first DBMM but rather for resolving unsynchronized first data containers and/or performing a privilege check. Thus, the query execution plan is computed by the first query optimizer of the first DBMM not for optimizing the execution of the stored procedure within the first DBMM, but is rather used for a completely different purpose, i.e., for enabling the dispatching of the execution of the computational task to the second DBMM even in case the computational task should require the availability of data containers which do not exist in second DBMM at the moment of receiving the query for executing the computational task.

According to some embodiments, the first stored procedure being a special form of a stored procedure is created as a derivative of a legacy stored procedure. The legacy stored procedure may be a stored procedure of the first DBMM having assigned the same computational task as the first stored procedure. The first stored procedure may be manually or automatically created as a derivative of the legacy stored procedure, e.g. to provide the first stored procedure as a "wrapper stored procedure" for the legacy stored procedure which comprises only the list of first data containers accessed by and user-defined functions called by the legacy stored procedure. Thus, a convenient method for dispatching computational tasks from a first to a second DBMM is provided by creating a first stored procedure as a derivative of a legacy stored procedure and by using the first procedure as a wrapper for the legacy stored procedure. Using it as a wrapper may imply that when the first DBMM or the data management system receives a query for executing the computational task, the first stored procedure assigned to the task is called instead of the legacy stored procedure. The first stored procedure may comprise an EXPLAIN query to be executed by the first query optimizer on each SQL statement contained in the first stored procedure. Each of the SQL statements may consist of a "SELECT *" statement to be performed on each first data container names and/or stored procedure names specified in the first stored procedure or received as an argument by the first stored procedure upon being called.

According to some embodiments, the synchronization process is performed on a regular basis, e.g. once in an hour or one in a day. In addition, or alternatively, the synchronization process may be triggered by automatically thrown evens or in response to a user-action. A user may specify e.g. in a configuration file when and what kind of data of the first DBMM is transferred to the second DBMM. According to some embodiments, the first and the second DBMM respectively comprises an agent involved in a replication process: a source agent of the first DBMM may capture changes of the data in the first data containers (i.e., in the first DBMM) and transfers the captured changes to an apply agent of the second DBMM. According to embodiments, the synchronization table is stored in the first catalogue. In some embodiments, the synchronization process is controlled by a component of the first DBMM.

That the second stored procedure lacks a specification of the names of at least one of the one or more ones of the second data containers comprising input data required for calculating the requested result may have the advantage that the names of the second data containers and/or the names of user defined functions which have to be accessed or called when executing the second stored procedure in the second DBMM may be provided. The at least one second data container name may be provided to the second stored procedure as an argument when calling the second stored procedure may provide for a great flexibility and may allow to communicate dynamically resolved second data table names to be used as input when executing the second stored procedure.

According to embodiments, the at least one second data container name and/or a name of at least one user-defined function (UDF) stored in the second DBMM is provided to the second stored procedure as an argument. The UDF may be, for example, a function called when executing the second stored procedure. The function may calculate an intermediate result, e.g. may round off or round up numbers, perform a calculation sub-task, or the like. For example, the first stored procedure may comprise an expression with a call to the UDF whereby a result set of a SELECT statement operating on one or more first data container names is provided as input. The data management system may automatically extract this expression from the first stored procedure, replace the first data container names by second data container names which are mapped in the synchronization mapping to the replaced first data container names, and forward the modified expression to the second stored procedure. For example, the second stored procedure may receive the modified expression as an argument when being called. Thus, the UDF may also be used for calculating an intermediate result when executing the second stored procedure without having to manually "hard code" a modified UDF in the second stored procedure.

According to embodiments, the identification of all synchronized first data containers comprising the input data required for calculating the result is performed by executing an EXPLAIN operation on any first data container name received by the first stored procedure as an argument and/or by executing an EXPLAIN operation on one or more user-defined SQL functions stored in the first DBMM and comprising some program logic to be used for computing the requested result.

According to embodiments, the identification of the first data containers comprises:

determining, e.g. by evaluating the query execution plan, for each of the identified first data containers, if a client system having submitted the request has all necessary privileges to access the first data container;

only in case the client system has all necessary privileges to access all identified first data containers, performing the identification of the list of names of the second data containers; and in case the client system lacks one or more necessary privileges to access all identified first data containers, terminating the method without identifying the list of names of the second data containers and without executing the second stored procedure.

The foregoing method prohibits client systems that lack the necessary privileges from accessing or calculating results on a given set of input data. CPU power is saved by terminating the method in case the client is not allowed to access one or more of the first data containers that would have to be accessed if the computational task would be executed in the first DBMM.

According to embodiments, the at least one unsynchronized first data container is a view. The view is configured for retrieving data from one or more synchronized first data containers being database tables. Resolving views in the first DBMM automatically to its source tables may be advantageous as the view in the first DBMM may ease the construction of database queries which shall directly operate on the first DBMM. Synchronizing views is usually not an option because views are typically used as temporary data container only. By resolving views to the respective source tables, it is nevertheless possible to dispatch a computational task involving access to a view to the second DBMM.

According to embodiments, the determining, for the at least one unsynchronized first data container being a view, if a client system has all necessary privileges to access the view comprises:

determining, by the first database management module, if the client system has all necessary privileges to access the view; the determination may be performed e.g. by evaluating the query execution plan having been computed for the first stored procedure;

in case the client system has all necessary privileges to access the view, returning, by the first database management module, the result that the client system has all necessary privileges to access the view irrespective of whether the client system is privileged to access the one or more synchronized first data containers to which the view is resolved.

For example, if a view V1 in the second DBMM is configured to retrieve data from tables T2 and T3 in DBMM and if the client system has the necessary privileges to access the view V1 but not the tables T2 or T3, the data management system may nevertheless create a view V1' in the second DBMM configured to retrieve data from the tables T2' and T3' in the second DBMM and execute the second stored procedure in the second DBMM. For example, the creation of the view V1' may be performed by a receiver module having all privileges to manipulate all second data containers in the second DBMM.

The above mentioned features may be advantageous as user privileges may be evaluated in a highly fine-grained manner in some example embodiments, a user of a client system may be allowed to access a particular view V1 (which is not synchronized with the second DBMM) in the first DBMM, but may not be allowed to directly access the source tables T2 and T3 from which the view V1 retrieves its input data. Thus, by evaluating privilege information for the view, and using this information for deciding if the second stored procedure shall be executed or not may be beneficial because the very fact that the second stored procedure performs the same computational task and accesses the same input data (albeit in differently named data containers) already ensures that the client does not receive any information the client is not entitled to receive. Thus, not the second DBMM performs an evaluation of the privileges of the client system, but rather the first DBMM based on a query execution plan of the first query optimizer may perform the privileges evaluation that will determine whether or not the second stored procedure will be executed in the second DBMM. In some embodiments, the DBMM2 may lack a privilege check functionality completely or may lack it when executing stored procedures. In this context, using the privilege check by the DBMM1 may nevertheless provide an accurate safety measure ensuring that the requested computational task is executed in the second DBMM only in case the client device has the necessary privileges.

In a further beneficial aspect, information which was computed anyway for resolving unsynchronized first data containers (i.e., the query execution plan) is re-used also for evaluating the privileges, thereby saving computational resources.

Depending on the embodiment, the determination if a client system lacks one or more necessary privileges to access a particular first data container is performed by one or more of the following approaches:

a) evaluating metadata of the first data container (which may be e.g. a database table or a database view) in the first catalogue; or b) dynamically creating and executing a query under a particular user of the client-system on the first data container (table or view) to determine if an error is thrown; or c) performing an EXPLAIN query on the first data container (e.g. table or view);

Approach a) may have the advantage that no query is executed that will result in the throwing of an error which again may trigger complex and computationally demanding error handling routines of the first DBMM. In addition, this may allow using and integrating a second DBMM into the data management system which lacks an own user privileges management functionality. The privileges as specified in DBMM1 may be used in an identical manner in the DBMM2, i.e., may be used to determine if a second data container synchronized with the first data container whose meta data was evaluated may be accessed or not.

Approach b) may be advantageous in case of a complex privileges structure including multiple user-groups and subgroups which could be complicated or even impossible for the first query execution planner to resolve.

Approach c) may be beneficial because EXPLAIN query is fast and is used anyway to resolve unsynchronized first data containers. For example, the first query optimizer, when computing the query execution plan, uses the query execution plan both for identifying the structure of the first data containers and for determining if a client system has the necessary privileges to access a particular first data container.

An EXPLAIN query is a DBMM-provided command that obtains information about access path selection for an explainable statement. A statement is explainable, for example, if it is a SELECT, MERGE, or INSERT statement, or the searched form of an UPDATE or DELETE statement. An explainable statement may also comprise one or more user-defined function provided that each of the user-defined functions is also explainable. The information that is obtained can be stored, for example, in a set of supplied user tables that are called EXPLAIN tables. The EXPLAIN tables can be populated with information about the access path of the explained statement, the estimated cost of executing the explainable statement, with information about how the first DBMM resolves user-defined functions that are referred to in the explainable statement, with additional information about the execution of the explainable statement. The access path may comprise base tables having been identified by the EXPLAIN query resolving database views. For example, an EXPLAIN query on a "SELECT * from T1, V1", V1 being a view configured to retrieve data from tables T2 and T3, will reveal if a user has authorization to access referenced tables T1, T2 and T3, the execution plan, how much this query costs, the number of result rows, table size, and so on.

For example, when performing an EXPLAIN query for a first stored procedure, the first query optimizer may evaluate the metadata in the first catalogue for completely resolving views whose name is specified in the first stored procedure to base tables (so the second SP does not have to access a view and no new second data container needs to be created in the second DMBS dynamically) or may use the metadata to extract a CREATE statement for the view.

The EXPLAIN query performed on a view will fail if a privilege to the view is missing, but not when only a privilege to access an input data table of the view is missing. Thus, two conceptually different steps can be performed within a single operation and thus with minimum computational overhead. By performing the name resolution of the first data container names via the synchronization mapping only in case the client system is allowed to access the corresponding first data container, the consumption of CPU power is further reduced.

According to embodiments, the first stored procedure comprises a user-defined function being explainable by a EXPLAIN functionality of the first DBMM but not being explainable by an EXPLAIN functionality of the second DBMM. The method comprises evaluating, by the first DBMM, the query execution plan generated by the first optimizer for the first stored procedure for identifying a plurality of synchronized first data containers; identifying one or more of the second data containers mapped to the plurality of synchronized first data containers; creating an SQL expression comprising the names of the identified one or more second data containers, whereby the names in the SQL expression are connected by SQL operations in a way that the SQL expression is a functional equivalent to the user-defined function; and providing the SQL expression as an argument to the second stored procedure for enabling the second stored procedure to execute the functional equivalent of the user-defined function in the second DBMM.

This may have the advantage that if a UDF is only defined in DBMM1, and DBMM2 doesn't "understand" this UDF, the EXPLAIN functionality of the DBMM1 can be used for resolving the data sources of the UDF and for identifying the program logic specified in the UDF for creating a plain-SQL expression that can be performed as part of the second stored procedure also by the second DBMM.

According to embodiments, the SQL expression being a functional equivalent to the UDF in the first stored procedure is an SQL construct which can be resolved by the second DBMM without additional dependencies (e.g. to other libraries). That includes names and tables of the second DBMM and SQL-bodied functions as well as anything else that the second DBMM can resolve.

According to embodiments, the computing of the query execution plan or the identification if the client system has all necessary privileges is performed by the first optimizer by executing an EXPLAIN functionality provided by the first database management module.

According to embodiments, the computing of the query execution plan and the identification if the client system has all necessary privileges being performed by the first optimizer by executing an EXPLAIN functionality provided by the first database management module. This may be beneficial because the same source of information, the Explain functionality, is used for performing two different tasks at the same time, thereby reducing the time and the computational resources required compared to performing both tasks individually. For example, the EXPLAIN functionality may be used by the first query optimizer for generating the query execution plan for the first stored procedure.

According to embodiments, the method comprises triggering, in response to having identified the list of names of all second data containers mapped to the identified and synchronized first data containers, the performing of the second stored procedure. For example, the triggering may be performed by the executed first stored procedure and/or a component of the first DBMM, e.g. the first query optimizer, or by any other component of the data management system capable of directly or indirectly causing the second stored procedure to be executed.

The triggering may be implemented, for example, by throwing a trigger event, also referred therein as "trigger signal" by the first DBMM upon having successfully calculated and evaluated the query execution plan and upon optionally having in addition determined that the client system has all required privileges to trigger the execution of the requested computational task. The trigger signal optionally comprises the list of names of the second data containers to be used as input by the second stored procedure.

According to embodiments, the triggering of the execution of the second stored procedures comprises calling, by the component of the data management system having caused the first query optimizer to compute the query execution plan, the second DBMM. The second DBMM is called to execute the second stored procedure, the call to the second stored procedure comprising the list of names of the identified second data containers, the second stored procedure being performed in response to the receiving of the call by the second database management module.

According to embodiments, the first and the second stored procedures respectively comprise a call to a user-defined function. The user-defined function is specified in SQL. The method comprises: using, by the data management system, the query execution plan to identify all first data containers that would be accessed upon executing the user-defined function, thereby either resolving any unsynchronized first data container specified in the user-defined function to synchronized first data containers from which the at least one unsynchronized first data container is configured to retrieve input data, or triggering the second database management module to create a new second data container in accordance with information of the unsynchronized first data container in the query execution plan, the new second data container being structurally identical to the at least one unsynchronized first data container.

According to embodiments, the at least one unsynchronized first data container not having assigned any one of the second data containers in the synchronization mapping is a first data container, e.g. a view, for which no structurally identical second data container exists in the second database management module.

According to embodiments, the triggering of the second DBMM to create a new second data container in accordance with information on the unsynchronized first data container in the query execution plan, the new second data container being structurally identical to the at least one unsynchronized first data container, comprises evaluating, by the first DBMM, the first catalogue for automatically extracting an SQL create statement for dynamically and automatically creating the new second data container. The at least one unsynchronized first data container is a view. The new second data container is also a view that is stored in the second DBMM and is structurally identical to the view having been identified as the unsynchronized first data container. The method further comprises triggering the second DBMM to perform the extracted SQL create statement, thereby creating the view in the second DBMM. The performing of the second stored procedure comprises reading input data from one or more of the identified second data containers by calling the created view. For example, in some embodiments privilege information on the unsynchronized first data container and/or structural information on the unsynchronized first data container may be derived from the query execution plan and may be supplemented with further data from the first catalogue, e.g. table encoding information or the like, for creating the new second data container in accordance with the information on the unsynchronized first data container in the query execution plan and the first data catalogue.

This may be advantageous, because in case the missing views are dynamically created in the second DBMM, many complex JOIN operations of a first or legacy stored procedure which access the view in the first DBMM may be re-used with no or only minimum changes as the data management system automatically ensures that a structurally identical copy of the unsynchronized first data container is created dynamically in the second DBMM for allowing the execution of the computational task in the second DBMM.

According to embodiments, the first data containers comprise both database tables and views. Only the first data containers which are database tables are synchronized with the second database management module and are mapped via the synchronization-mapping to one or more of the second data containers. First DBMM of a mixed table-view type may be advantageous as the views provide a convenient layer of abstraction for local or remote clients or UDFs. Embodiments of the invention may allow using this advantageous DB-system architecture and nevertheless allow dynamically dispatching complex computational tasks involving some of the non-synchronized views to the second DBMM.

According to embodiments, the first stored procedure comprises a procedure interface and a procedure body. The procedure interface is configured for receiving one or more first data container names contained in the query as input via the procedure interface. The procedure body comprises a specification of an EXPLAIN functionality to be performed for each first data container name received via the procedure interface. The first procedure is configured for:

receiving one or more first data container names specified in the query as input via the procedure interface;

in response to the receiving of the one or more first data container names, executing the EXPLAIN functionality for each of the first data container names specified within the procedure body and/or received as an argument by the first stored procedure.

According to embodiments, the first stored procedure comprises a first procedure interface configured for receiving one or more first data container names as input and comprises a first procedure body. The first procedure body specifies how data has to be retrieved from the first data containers identified by the first data container names and how the retrieved data is to be processed. In addition or alternatively, the second stored procedure comprises a second procedure interface configured for receiving one or more second data container names as input. The second stored procedure comprises a second procedure body specifying how data is to be retrieved from the second data containers identified by the second data container names and specifying how the retrieved data is to be processed. The performing of the second stored procedure comprises using the list of names of the identified second data containers as input of the interface of the second stored procedure.

Using the list of names of the identified second data containers as input of the interface of the second stored procedure may be beneficial as the interface of the second stored procedure is highly generic. Thus, in case the number and/or names of the identified first data containers deviate from the number and/or names of the second data containers in the list, it is not necessary to adapt the interface and method signature of the second stored procedure. Preferentially, in addition to the list of names of the second data containers, additional parameters are provided as arguments to the interface of the second stored procedure when calling the second stored procedure. The additional parameters can be, for example, parameters contained in the request of the client system, names of program routines external to both the first and the second DBMM which can be called by the first or the second DBMM, query predicates, e.g. search values provided by a user or an application program that have to be matched in a SELECT SQL query, the time or date format that should be used when performing the second stored procedure, table encoding (UNICODE, ASCII, EBCDIC), and any other parameter value that the client system or the DBMM1 "knows" and the DBMM2 doesn't.

In a further aspect, the invention relates to a computer program product for operating a data management system. The computer program product comprises a computer readable storage medium having program instructions embodied therewith. The program instructions are executable by a processor and are configured to cause the processor to execute the method according to any one of the embodiments described herein.

In a further aspect, the invention relates to a data management system comprising:
 a first database management module comprising a first query optimizer, first data containers and a first catalogue with first metadata, the first metadata being descriptive of the structure of the first data containers, the first database management module further comprising a first stored procedure, the first stored procedure being assigned to a computational task and being configured to read input data from one or more of the first data containers;
 a second database management module comprising a second query optimizer, second data containers and a second catalogue with second metadata, the second metadata being descriptive of the structure of the second data containers, the second database management module further comprising a second stored procedure for calculating the same result in the second database management module, the second stored procedure being configured to read input data from one or more of the second data containers, the second stored procedure being configured for performing the computational task and lacking a specification of the names of at least one of the one or more ones of the second data containers comprising the input data for the second stored procedure; and a synchronization-mapping specifying from which ones of the first data containers data is transferred to which ones of the second data containers in a synchronization process between the first and the second database management module, at least one of the first data containers being an unsynchronized first data container.

The first database management module is configured for receiving a request to perform the computational task.

The data management system is configured for, in response to receiving the request:

causing the first query optimizer to automatically compute a query execution plan for the first procedure;

using the query execution plan to identify all first data containers that provide input data for the requested computational task, thereby either resolving the at least one unsynchronized first data container to one or more other first data containers from which the at least unsynchronized first data container is configured to retrieve input data, each of the other first data container being a synchronized first data container, or triggering the second database management module to create a new second data container in accordance with information on the unsynchronized first data container in the query execution plan, the new second data container being structurally identical to the at least one unsynchronized first data container; and evaluating the synchronization mapping for identifying a list of names of all second data containers mapped to the identified and synchronized first data containers.

The second database management module is configured for performing the second stored procedure, the second stored procedure thereby using the list of names of the identified second data containers for identifying the second data containers comprising the input data, and reading the input data from the identified second data containers.

For example, the first DBMM may comprise a plurality of first stored procedures, each being assigned to a different computational task and each corresponding to a second stored procedure assigned to the same computational task and stored in the second DBMM. The request of a client system may specify which ones of the supported computational tasks shall be executed. A second stored procedure being configured for performing the requested computational task may be configured to read input data from one or more second data containers. The names of one or more of the second data containers and optionally calls to one or more UDFs of the second DBMM may be specified in the body of the second stored procedure, but more preferentially, the names of all second data containers from which input data is read when performing the second stored procedure and/or the names of any called UDFs is received dynamically as an argument upon the second stored procedure being called.

First data containers which provide input data for the requested computational task are actually not used for retrieving the input data in case the computational task is successfully dispatched to and executed in the second DBMM. In case the dispatching should not be possible, according to some embodiments the first stored procedure or a legacy stored procedure is executed instead of the second stored procedure for performing the requested computational task in the first DBMM.

FIG. 1 is a block diagram of a data management system 102 according to an embodiment of the invention. The data management system can be, for example, a distributed system comprising a first DBMS acting as first database management module DBMM1 and at least one second DBMS acting as a second database management module DBMM2. The data management system comprises one or more processors 104, a non-volatile storage medium 106, main memory 108 and a network interface for receiving requests R from one or more client systems 134. The first DBMM 110 can be, for example, DB2 for z/OS and the at least one second DBMM 128 can be, for example, Netezza's analytics accelerator for DB2. The first DBMM comprises one or more first data containers, e.g. database tables T1, T2, T3 and T4 and a database view V1 126. It comprises a first catalogue 112 which comprises meta-data, in particular structural information on the first data containers managed by the first DBMM. In addition, the first DBMM comprises a first query optimizer 114, capable of computing a query execution plan for database queries to be executed in the first DBMM. In addition, the first DBMM comprises a first stored procedure 120 being assigned to a computational task, e.g. a clustering algorithm like the K-means algorithm Optionally, the first DBMM may comprise a legacy stored procedure configured for performing the K-means algorithm. While the legacy store procedure 117 may comprise a plurality of complex join operations and other database operations and/or UDF calls, the first stored procedure 124 may act as a wrapper to the legacy store procedure and may only comprise one or more EXPLAIN statements to be performed on first data containers and UDFs whose names are already specified within the first stored procedure 124 and/or whose names are received as an argument when the first stored procedure is called.

The second DBMM comprises one or more second data containers, e.g. tables T1', T2' and T3'. It comprises a query optimizer 132 configured to compute a query execution plan for queries to be performed in the second DBMM and comprises a second catalogue 130 comprising meta-data of the second data containers. In addition, the second DBMM may comprise a receiver module 135 configured to receive or detect a trigger signal TS being indicative that the second stored procedure 116 shall be executed and configured for calling the second stored procedure in response to receiving or detecting the trigger signal. The receiver module 135 may likewise be implemented as a separate component of the data management system which is neither part of the first nor of the second DBMM. The second stored procedure comprises program logic, e.g. in the form of complex SQL queries and UDF calls which operate on placeholders for performing a K-means clustering algorithm. Thus, the first and the second stored procedure and the optional legacy store procedure all relate to and are assigned to the computational task of performing a K-means clustering algorithm. The placeholders are filled dynamically when the second stored procedure is called. The placeholders are filled with the names of the second data containers which comprise the input data for the clustering algorithm and/or with modified UDFs or query parameters.

The data content of at least some of the first data containers are transferred ("synchronized with") to specific ones of the second data containers. This is indicated in FIG. 1 by the "sync." arrows. The specific assignment of second data containers to first data containers from which the data is received during the synchronization process is specified in a synchronization table 138. In some embodiments, the synchronization table 138 is stored as part of the first catalogue.

The data management system may comprise additional second DBMM whose second data containers may also receive data from specifically assigned first data containers (and thus may also be synchronized with that first data containers). Each first or second DBMM of the data management system may be hosted on a separate computer system connected to the computer system hosting the other first or second DBMM via a network, e.g. the Internet. Alternatively, or the first and second DBMMs of the data management system may be hosted on one and the same computer system.

At first, the first DBMM receives a request R from a client system 134. The request can be a request to perform a K-means clustering algorithm on some input data, whereby the input data may be specified e.g. within the request, within the first stored procedure or in a configuration of the first DBMM. In response to receiving the request, the first DBMM invokes the first stored procedure 124 instead of the legacy store procedure 117 for performing the K-means clustering algorithm Thereby, the first DBMM may pass some parameters, e.g. some search parameters or parameter indicating the source data containers as arguments to the first stored procedure. The first stored procedure may basically consist of one or more EXPLAIN functions to be performed by the first query optimizer on "SELECT *" operations on all first data containers selected by the parameters as source data containers. When the first stored procedure is called, the first query optimizer 114 computes a query execution plan for the first stored procedure. The query execution plan comprises structural information on the first data containers and their dependencies comprising input data. In addition, the query execution plan comprises privilege information for each of the first data containers and in addition comprises information on an optimal query path for execution in the first DBMM which is ignored and only evaluated in case the execution of the requested K-means algorithm cannot be dispatched to the second DBMM.

The first DBMM evaluates the query execution plan for completely resolving all first data containers, including first data containers not synchronized with a second container, to first data containers which are mapped in the synchronization mapping 138 to at least one second container. For example, the view 126 is an unsynchronized first data container which is not mapped in the synchronization mapping 138 to any one of the second data containers. However, the meta-data of the view 126 stored in the first catalogue 112 in combination with the query execution plan is used for identifying first data containers T2 and T3 as base tables from which the data of the view is actually derived. Thus, the first DBMM uses the query execution plan calculated for the first stored procedure for identifying the first data containers T1, T2 and T3 as the first data containers comprising all the relevant input data for the K-means clustering algorithm. The first DBMM evaluates the synchronization mapping 138 for identifying a list of names of all second data containers T1', T2' and T3' which are mapped to and are synchronized with the identified first data containers T1, T2 and T3. The name list NL of the identified second data containers is forwarded to a receiver module 135 of the second DBMM.

The receiver module may access the second catalogue 130 for checking that all second containers specified in the received name list NL are indeed contained in the second DBMM. If so, the receiver module 135 calls the second stored procedure 116, thereby providing the name list NL of the identified second data containers and optionally further parameters as arguments to the called second stored procedure. The further parameters may comprise time and date settings, encoding information, query parameters, SQL expressions comprising SQL functions being functional equivalent to UDFs of the first DBMM and the like. The called second stored procedure 116 performs the requested K-means clustering algorithm, thereby retrieving input data from the second data containers T1', T2' and T3' whose names were provided as arguments. This is indicated in FIG. 1 by the dotted arrows "ACCESS". Thus, the K-means clustering can be dynamically dispatched to and executed by the second DBMM although there does not exist any view or table in the second DBMM that is synchronized with the view 126 of the first DBMM. The results of the K-means algorithm are returned from the second DBMM to the first DBMM and from there returned to the client system 134.

Figure 2:
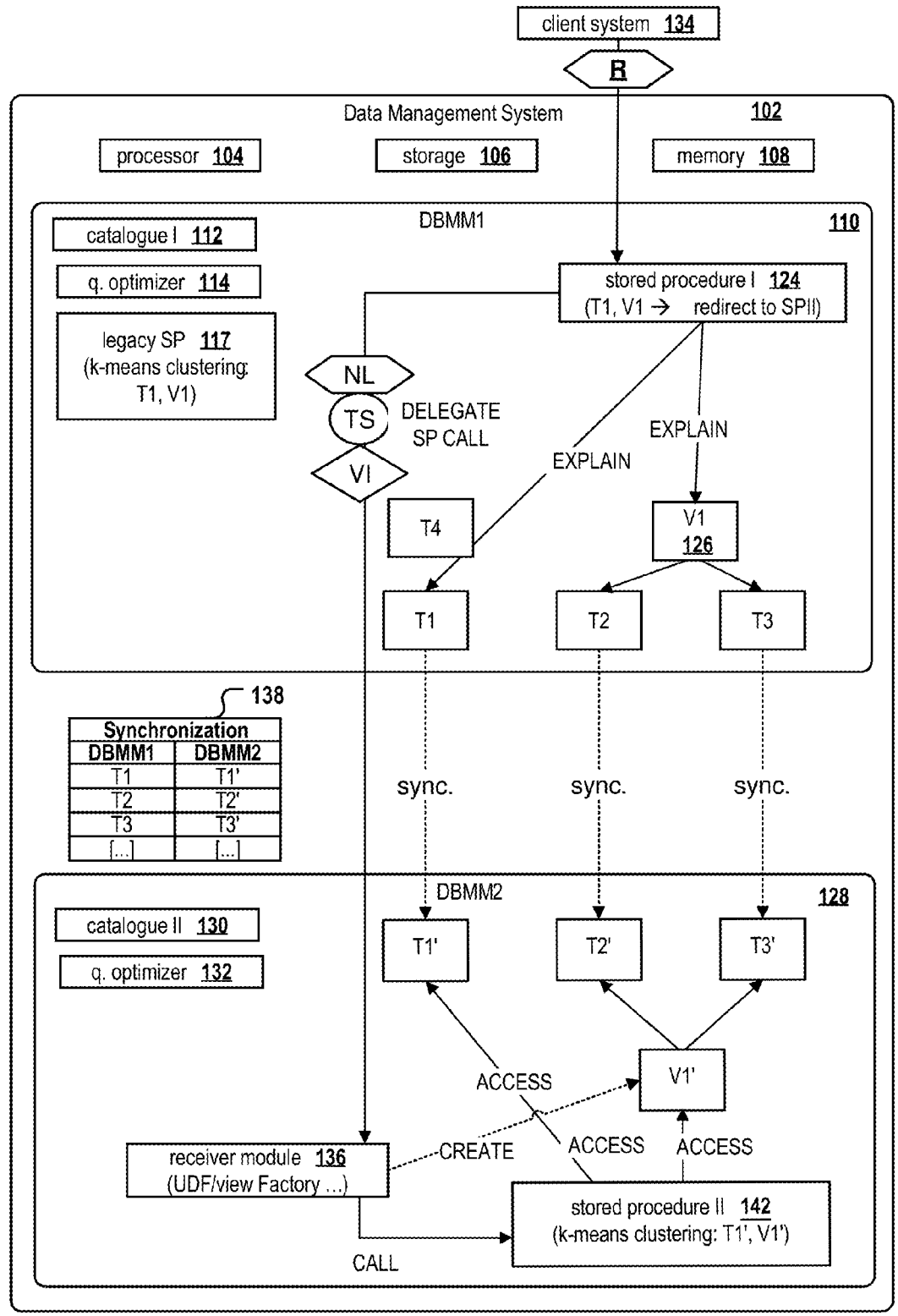
FIG. 2 depicts a data management system according to another embodiment of the present invention.

FIG. 2 depicts a data management system according to another embodiment of the invention which comprises basically the same components as the data management system depicted in FIG. 1. The data management system of FIG. 2 is configured to execute an alternative method for dispatching a requested computational task from the first to the second DBMM. Here, the query execution plan computed for the first stored procedure 124 is not used by the first DBMM for completely resolving the unsynchronized first data container, the view V1 126, to their synchronized input tables T2 and T3. Rather, the view-related, structural information VI of the view 126 specified in the query execution plan and/or in the meta-data of the first catalogue 112 is forwarded to the receiver module 136. The structural information VI on view V1 may be forwarded to the receiver module 136 together with the list of names NL of the identified, mapped second data containers T1 that could be identified without resolving a view to its input data tables. Contrary to the receiver module 135 of the embodiment of FIG. 1, the receiver module 136 of the embodiment of FIG. 2 is configured to use the received view-related structural information VI to automatically create in the second DBMM a new second data container V1' in accordance with the structural information VI. After the new second data container V1' was successfully created in the second DBMM, the receiver module 136 cause the second stored procedure 142 which is also configured for calculating a K-means clustering algorithm. However, the stored procedure 142 comprises SQL instructions which directly operate on the new second data container V1' and thus rely on the existence of a second container that did not exist in the second DBMM at the moment when the request R for performing the K means algorithm was received by the first DBMM.

Figure 3:
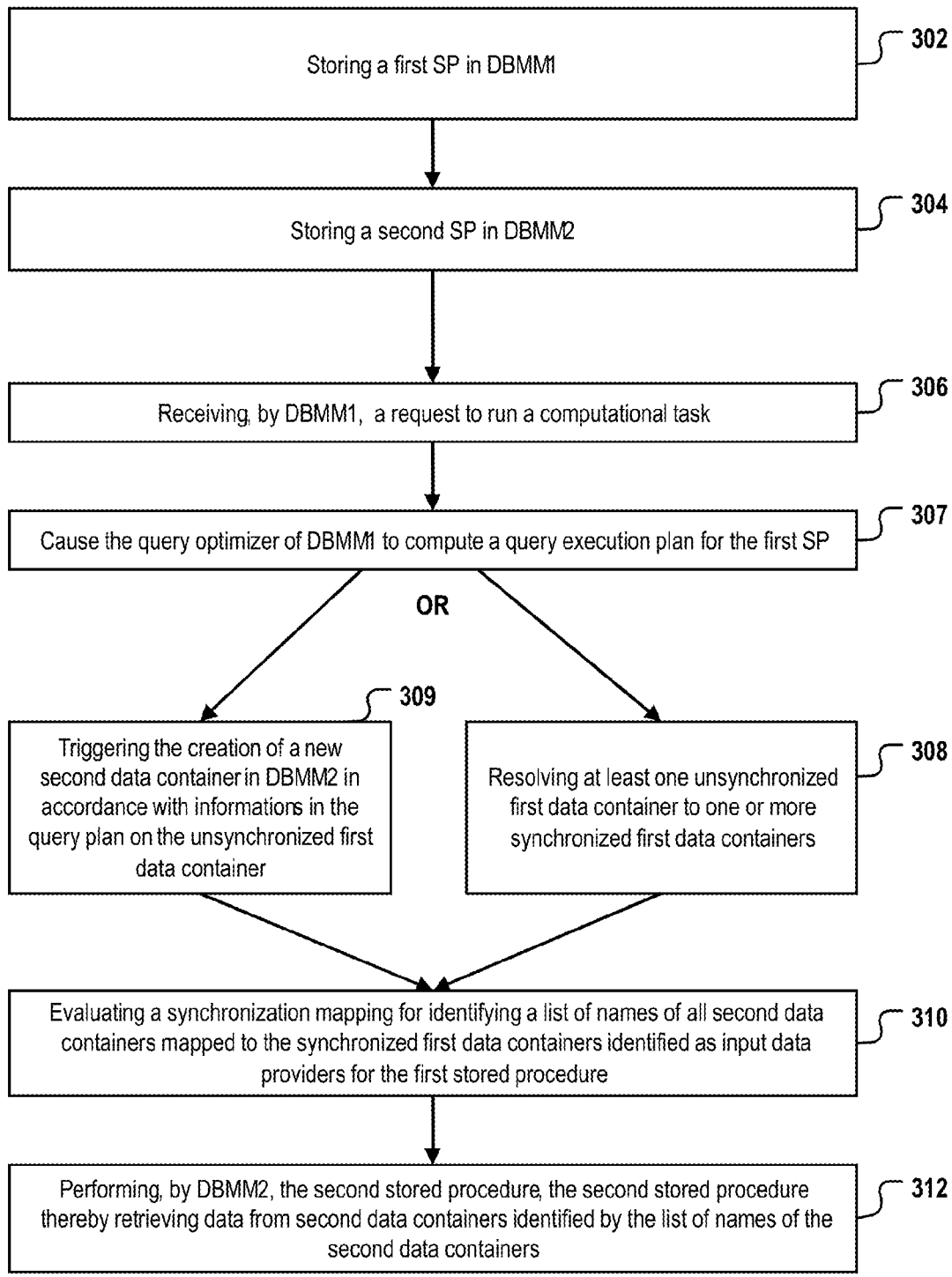
FIG. 3 depicts a flow chart of a method according to an embodiment of the present invention.

FIG. 3 depicts a flow chart of a computer-implemented method for operating a data management system 102 as depicted, for example, in FIG. 1 or 2, according to embodiments of the invention. In a first step 302, storing a first stored procedure 124 in the first DBMM. The first stored procedure is assigned to a computational task and is configured to read input data from one or more T1, T2, T3, V1 of the first data containers. At least one V1 of the first data containers is an unsynchronized first data container.

A step 304 of storing a second stored procedure 116 in the second DBMM. The second stored procedure is configured for performing the computational task. The second stored procedure lacks a specification of the names of at least one of the one or more T1', T2', T3' ones of the second data containers comprising input data for the second stored procedure. At runtime of the data management system, the method further comprises steps 306-312.

In step 306, the first DBMM receives a request R to perform a particular computational task, e.g. the k-means clustering algorithm. The request R may comprise an indication on the source data containers to be used. For example, the request could comprise a country name "US" to indicate that the clustering algorithm should selectively be executed on data containers comprising data relating to the US.

In response to receiving the request, the method comprises executing steps 307 to 312. In step 307, the data management system causes the first query optimizer to automatically compute a query execution plan for the first procedure assigned to the requested computational task. The data management system then uses the query execution plan to identify all first data containers that provide input data for the requested computational task. Thereby, the data management system either resolves in step 308 the at least one unsynchronized first data container to one or more other first data containers from which the at least unsynchronized first data container is configured to retrieve input data, each of the other first data container being a synchronized first data container. Or the data management system triggers in step 309 the second DBMM to create a new second data container in accordance with information of the unsynchronized first data container in the query execution plan, the new second data container being structurally identical to the at least one unsynchronized first data container. In step 310, the data management system evaluates the synchronization mapping for identifying a list of names of all second data containers mapped to the identified and synchronized first data containers. In step 312, the second DBMM performs the second stored procedure, the second stored procedure thereby using the list of names of the identified second data containers for identifying the second data containers comprising the input data, and reading the input data from the identified second data containers T1', T2', T3'. In case step 309 was executed, the reading of the input data may be performed via the newly created second data container V1', e.g. a view created in the second DBMM for retrieving data from tables T2' and T3'.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the following, an example shows the results of using an EXPLAIN query on a view V1 acting as an unsynchronized first data container for resolving the unsynchronized first data container to synchronized first data containers, i.e., tables T2 and T3 in the first DBMM as depicted, for example, in FIGS. 1 and 2.

The following CREATE SQL elucidate example schemas for the view V1 and the tables T2 and T3 from which the view V1 is configured to read input data from and of table T1 from which the first stored procedure is configured to directly retrieve input data:

CREATE TABLE DB.T1 (ID_SHOP INTEGER NOT NULL, NAME_SHOP CHAR(20) NOT NULL);
CREATE TABLE DB.T2 (ID INTEGER NOT NULL, NAME CHAR(20) NOT NULL);
CREATE TABLE DB.T3 (ID INTEGER NOT NULL, SALARY INTEGER NOT NULL);
CREATE VIEW DB.V1 (ID, NAME, SALARY) AS SELECT DB.T2.ID, DB.T2.NAME, DB.T3.SALARY FROM DB.T2,DB.T3 WHERE DB.T2.ID=DB.T3.ID

In response to receiving a request R from a client device for performing a computational task, e.g. the K-means clustering algorithm, the first DBMM determines that this task should preferably be dispatched for execution to the second DBMM and identifies a first stored procedure of the first DBMM which is assigned to the task. This first stored procedure may be a stub stored procedure and may lack the program logic actually necessary to perform the requested task. The first stored procedure may merely comprise "EXPLAIN SELECT *" statements for each first data container that shall provide input data for the requested computational task, whereby the names of the first data containers may be hardcoded in the first stored procedure and/or may be received dynamically as arguments upon calling the first stored procedure. For example, the first stored procedure may comprise or consist of the following statements:

SET CURRENT QUERY ACCELERATION=ALL;
For each <SP1-arguments[ ]>:{
EXPLAIN SELECT * from SP1-arguments[current-index-position];
}

The expression "SET CURRENT QUERY ACCELERATION=ALL" can be used, for example, when the data management system comprises DB2 z/OS as first DBMM. If other DBMM types are used, the expression may have a different syntax. The expression informs the first optimizer that the following query (here: "SELECT * from SP1-arguments[current-index-position]) shall dispatched for execution to the second DBMM, and that the names of the first data containers to be accessed by the first stored procedure (here: which may be provided as arguments SP1-arguments[ ] to the first stored procedure) shall be resolved, if possible, to respectively mapped and synchronized second data containers of the second DBMM. Thus, this expression causes the first query optimizer to evaluate the synchronization mapping for identifying the name list of second data containers synchronized to the first data containers. If this expression is left out, the first optimizer would just return the information about the query that will be run on the DBMM1 only. Thus, according to embodiments, the first optimizer can be run in two different modes, wherein in one mode the EXPLAIN functionality is performed as known in the art, i.e., without resolving first data container names and in another mode the names are resolved and/or information on unsynchronized first data containers are gathered for creating a structurally identical second data container in the second DBMM. However, other embodiments may implement the step of resolving the first data container names to second data container names differently.

The first DBMM may automatically determine, e.g. by means of a configuration file, all first data containers (base tables and views) and optionally also all user defined functions stored in the first DBMM which comprise the necessary input data (base tables and views) and data processing logic (views and UDFs) for calculating the requested result. In this case, the first DBMM may dynamically and automatically determine that the table T1, the view V1 and the user defined function "MyUDF( )" in combination are capable of providing the requested result and may provide the determined first data container names (here: view "V1", T1) and/or an SQL statement that contains the UDF "MyUDF( )" as input arguments of the first stored procedure. Thus, the called stored procedure will execute:

EXPLAIN SELECT * from DB.T1;

EXPLAIN SELECT * from DB.V;
EXPLAIN SELECT MyUDF(column_name) from DB.T1;

The command "SET CURRENT QUERY ACCELERATION=ALL; EXPLAIN [ . . . ]" (or, according to alternative implementations, any other expression in a different syntax having the same function and meaning) will force the first query optimizer to explain and optimize each SELECT statement in such a way:

that it automatically accesses the metadata in the first catalogue for resolving all views of the first DBMM processed by the called first stored procedure to one or more base tables of the first DBMM or for identifying structural information of the unsynchronized first data container V1 for enabling the creation of a structurally identical second data container V1' in the second DBMM; and that it automatically accesses the synchronization mapping for resolving all resolved table names (e.g. "T2" and "T3" for view "V1") and all table names (e.g. "T1") of the first DBMM processed by the called first stored procedure to one or more of the second data containers of the second DBMM being mapped in the synchronization mapping to the resolved or processed tables of the first DBMM.

Thus, in this example, all first data containers that comprise the input data for the computational task assigned to the first stored procedure are identified, by means of the query execution plan, as: T1, T2 and T3. The unsynchronized view V1 is completely resolved by means of the query execution plan computed for the first stored procedure to the base tables T2 and T3. The tables T2 and T3 are identified as synchronized first data containers providing input for the requested task, because they are mapped in the synchronization mapping to corresponding second data containers T2' and T3'. This may have the advantage that no additional views have to be created by the DBMM2 in order to allow computing the result by the DBMM2. However, in alternative embodiments, the view V1 may not be resolved to its base tables and the information on structural and other features of the unsynchronized first data container V1 is instead forwarded to a receiver module 136 for enabling the receiver module to create a new second data container in accordance with the forwarded information. In this case, the receiver module creates a copy V1' of the view V1 in the second DBMM, the copy V1' being configured for retrieving input data from second data containers T2', T3' mapped in the synchronization mapping to respective first data containers T2, T3 from which the original view V1 is configured to retrieve its input data.

Thus, the query execution plan is used for extracting a list of names of all identified and synchronized first data containers, e.g. "T1", "T2" and "T3" comprising input data for the requested computational task. In addition, the first query optimizer, during or after the computation of the query execution plan for the first stored procedure, accesses the synchronization mapping in order to identify, for each of the first data containers, one or more second data containers T1', T2', T3' mapped to the identified and synchronized first data containers T1, T2, T3.

For example, the UDF MyUDF(column_name) could be specified by the following CREATE statement: CREATE FUNCTION MyUDF(column_name)
RETURN column_name+1;

The expression "SELECT MyUDF(column_name) from DB.T1" could be provided to the first stored procedure as an input argument, thereby determining that a column name index of the first DBMM "DB" of a table with table-prefix "T" should be increased by 1. The EXPLAIN to the expression would return an "explained" or "resolved" explained SQL statement understood by the second DBMM which does not comprise table T1. The resolved expression could be, for example, "SELECT ACCEL.T1'.column_name+1 from ACCEL.T1'; This expression is forwarded to the second DBMM and used as an argument when calling the second stored procedure.

According to embodiments, the data management system evaluates the query execution plan to also resolve one or more UDF to be called by the first stored procedure, thereby returning an SQL expression that can be interpreted by the second DBMM.

For computing the query execution plan, the first query optimizer may evaluate each first data container identified as providing input data for the requested computational task for determining if the user of the client device having submitted the request R has all necessary privileges to access the first data container. If not, the data management system throws an exception, the first data containers are not resolved to synchronized first data containers and their assigned second data containers and the task is not dispatched to the second DBMM.

The second DBMM may for example be an accelerator, e.g. Netezza's analytics accelerator for DB2/zOS. A stored procedure or a database-external program module may copy the data content and structure of the tables T1, T2 and T3 from the first DBMM to the second DBMM where respective tables T1', T2' and T3' exist. Typically, not all data containers of the first DBMM are mapped to a corresponding second data container in the second DBMM at the moment when the data management system receives the query. For example, the first DBMM may comprise a plurality (e.g. thousands) of base tables and a plurality (e.g. hundreds) of views used for retrieving data from the base tables. The second DBMM may comprise only base tables whose data content is synchronized with the base tables of the first DBMM but may not comprise a data container synchronized with or structurally corresponding to one of the views. The synchronized base tables of the second DBMM can be structurally identical or can be a structurally modified version of the base tables of the first DBMM. "Structurally modified" may imply that the base table in the second DMBS comprises one or more columns in addition to the base table in the first DBMM to which it is assigned via the synchronization mapping. In addition, or alternatively, it may imply that the base table lacks one or more of the columns of its assigned table in the first DBMM and/or that the name of the table or the names of one or more of its columns deviate from the assigned table.

For example, the first stored procedure may comprise, according to one implementation variant, an expression "SET CURRENT QUERY ACCELERATION=ALL; EXPLAIN SELECT * from [Placeholder-P24];" The placeholder P24 may be dynamically replaced by the name "V1" provided to the first stored procedure as an argument. The "EXPLAIN statement" instructs the first query optimizer to resolve all unsynchronized first data containers to synchronized first data containers, if possible, and to map each synchronized first data container to be accessed by the first stored procedure to a second data container in the second DBMM. Alternatively, the first optimizer will forward metadata of the view V1 extracted from the query execution plan to the second DBMM and trigger the second DBMM to dynamically create the view V1' before the execution of the second stored procedure is triggered.

If the user of the client system having sent the database query has all necessary table privileges, the names of the identified second data containers is forwarded to the second DBMM and is used as arguments for calling the second stored procedure on second data containers T1', T2' and T3' as depicted, for example, in FIG. 1. In some embodiments as depicted, for example, in FIG. 2, structural information of the unsynchronized first data container V1 is forwarded to the second DBMM for enabling an automated creation of a structurally identical second data container V1' in the second DBM, e.g. by executing the following SQL query:

CREATE VIEW ACCEL.V1' (ID, NAME, SALARY) AS SELECT ACCEL.T2'.ID, ACCEL.T2'.NAME, ACCEL.T3'.SALARY FROM ACCEL.T2', ACCEL.T3', WHERE ACCEL.T2'.ID=ACCEL.T3'.ID

Possible combination of features described above can be the following:

1. A computer-implemented method for operating a data management system 102, the data management system comprising a first DBMM 110 comprising a first query optimizer 114, first data containers T1-T4, V1 and a first catalogue 112 with first metadata, the first metadata being descriptive of the structure of the first data containers; a second DBMM 128 comprising a second query optimizer 132, second data containers T1', T2', T3', V1' and a second catalogue 130 with second metadata, the second metadata being descriptive of the structure of the second data containers; and a synchronization-mapping 138 specifying from which ones of the first data containers data is transferred to which ones of the second data containers in a synchronization process between the first and the second DBMM.

The method comprises: storing 302 a first stored procedure 124 in the first DBMM, the first stored procedure being assigned to a computational task and being configured to read input data from one or more of the first data containers, at least one of the first data containers being an unsynchronized first data container; and storing 304 a second stored procedure 116 in the second DBMM, the second stored procedure being configured for performing the computational task, the second stored procedure lacking a specification of the names of at least one of the one or more ones of the second data containers comprising input data for the second stored procedure.

The method comprises, at runtime of the data management system:
  receiving 306, by the first DBMM, a request R to perform the computational task;
  in response to receiving the request, the method comprises: causing 307, by the data management system, the first query optimizer to automatically compute a query execution plan for the first procedure assigned to the requested computational task; using, by the data management system, the query execution plan to identify all first data containers that provide input data for the requested computational task, thereby either resolving 308 the at least one unsynchronized first data container to one or more other first data containers from which the at least unsynchronized first data container is configured to retrieve input data, each of the other first data container being a synchronized first data container, or triggering 309 the second DBMM to create a new second data container in accordance with information of the unsynchronized first data container in the query execution plan, the new second data container being structurally identical to the at least one unsynchronized first data container;
  evaluating 310, by the data management system, the synchronization mapping for identifying a list of names of all second data containers mapped to the identified and synchronized first data containers;
  performing 312, by the second DBMM, the second stored procedure, the second stored procedure thereby using the list of names of the identified second data containers for identifying the second data containers comprising the input data, and reading the input data from the identified second data containers.

The above method may include a variety of options and variations listed below which may be performed individually or in combination. For example, the method may also include identification of the first data containers by:
  determining, for each of the identified first data containers, if a client system having submitted the request has all necessary privileges to access the first data container; and
  only in case the client system has all necessary privileges to access all identified first data containers, performing the identification of the list of names of the second data containers; and
  in case the client system lacks one or more necessary privileges to access all identified first data containers, terminating the method without identifying the list of names of the second data containers and without executing the second stored procedure.

The at least one unsynchronized first data container may be a view V1, the view being configured to retrieve data from one or more T2, T3 synchronized first data containers being database tables.

The method may also include determining, when the at least one unsynchronized first data container is a view, if a client system has all necessary privileges to access the view by determining, by the first DBMM, if the client system has all necessary privileges to access the view; in case the client system has all necessary privileges to access the view, returning, by the first DBMM, the result that the client system has all necessary privileges to access the view irrespective of whether the client system is privileged to access the one or more synchronized first data containers to which the view is resolved.

The method may also include computing the query execution plan or identifying if the client system has all necessary privileges by executing an EXPLAIN function with the first DBMM. For example the EXPLAIN function may be executed by the first optimizer.

The method may also include triggering the execution of the second stored procedure in response to having identified the list of names of all second data containers mapped to the identified and synchronized first data containers. For example, triggering the execution of the second stored procedures may include calling, by the component of the data management system having caused the first query optimizer to compute the query execution plan, the second DBMM to execute the second stored procedure, the call to the second stored procedure comprising the list of names NL of the identified second data containers, the second stored procedure being performed in response to the receiving of the call by the second DBMM.

The first and the second stored procedures respectively may include a call to a user-defined function, the user-defined function being specified in SQL and configured to the method comprising: using, by the data management system, the query execution plan to identify (308) all first data containers that would be accessed upon executing the user-defined function, thereby either resolving any unsynchronized first data container specified in the user-defined function to synchronized first data containers from which the at least one unsynchronized first data container is configured to retrieve input data, or triggering the second DBMM to create a new second data container in accordance with information on the unsynchronized first data container in the query execution plan, the new second data container being structurally identical to the at least one unsynchronized first data container.

10. The method of any one of the previous feature combinations, the at least one unsynchronized first data container not having assigned any one of the second data containers in the synchronization mapping being a first data container for which no structurally identical second data container exists in the second DBMM.

11. The method of any one of the previous feature combinations, the triggering the second DBMM to create a new second data container in accordance with information on the unsynchronized first data container in the query execution plan, the new second data container being structurally identical to the at least one unsynchronized first data container comprising:
  evaluating, by the first DBMM, the first catalogue for automatically extracting an SQL create statement for dynamically and automatically creating the new second data container, the at least one unsynchronized first data container being a view V1, the new second data container being a view stored in the second DBMM and being structurally identical to the view V1 being the unsynchronized first data container, and triggering the second DBMM to perform the extracted SQL create statement, thereby creating the view in the second DBMM;
  the performing of the second stored procedure comprising reading input data from one or more of the identified second data containers by calling the created view.

12. The method of any one of the previous feature combinations, the first stored procedure comprising a user-defined function being explainable by a EXPLAIN functionality of the first DBMM but not being explainable by an EXPLAIN functionality of the second DBMM, the method further comprising:
  evaluating, by the first DBMM, the query execution plan generated by the first query optimizer for identifying a plurality of synchronized first data containers to be accessed upon execution of the user-defined function;
  identifying, by the first DBMM, one or more of the second data containers mapped to the plurality of synchronized first data containers;
  creating an SQL expression comprising the names of the identified one or more second data containers, whereby the names in the SQL expression are connected by SQL operations in a way that the SQL expression is a functional equivalent to the user-defined function; and
  providing the SQL expression as an argument to the second stored procedure for enabling the second stored procedure to execute the functional equivalent of the user-defined function in the second DBMM.

13. The method of any one of the previous feature combinations, the first data containers comprising both database tables and views, wherein only the first data containers which are database tables are synchronized with the second DBMM and are mapped via the synchronization-mapping to one or more of the second data containers.

The method of any one of the previous feature combinations, the first stored procedure 124 comprising a procedure interface and a procedure body, the procedure interface being configured for receiving one or more first data container names contained in the query as input via the procedure interface, the procedure body comprising a specification of an EXPLAIN functionality to be performed for each first data container name received via the procedure interface, the first procedure being configured for:
  receiving one or more first data container names specified in the query as input via the procedure interface;
  in response to the receiving of the one or more first data container names, executing the EXPLAIN functionality for each of the first data container names specified within the procedure body and/or received as an argument by the first stored procedure 124.

The method of any one of the previous feature combinations, wherein the first stored procedure 124 comprises a first procedure interface configured for receiving one or more first data container names as input and comprising a first procedure body, the first procedure body specifying how data has to be retrieved from the first data containers identified by the first data container names and how the retrieved data is to be processed; and/or wherein the second stored procedure 116 comprises a second procedure interface configured for receiving one or more second data container names as input and comprising a second procedure body, the second procedure body specifying how data is to be retrieved from the second data containers identified by the second data container names and how the retrieved data is to be processed; the performing of the second stored procedure comprising using the list of names of the identified second data containers as input of the interface of the second stored procedure.

A computer program product for operating a data management system, the computer program product comprising a computer readable storage medium having program instructions embodied therewith, the program instructions executable by a processor to cause the processor to execute the method according to any one of the previous feature combinations.

A data management system 102 whose components are configured for performing a method according to any one of the above feature combinations.

What is claimed is:

1. A method, executed by a database management system, the method comprising:
  storing a first stored procedure in a first database management module;
  storing a second stored procedure in a second database management module;
  receiving by the first database management module a request to run a computational task with the first stored procedure;
  receiving a request to perform the computational task and in response thereto causing a first query optimizer in the first database management module to automatically compute a first query execution plan for the first stored procedure;
  identifying, based at least in part on the first query execution plan, all first data containers on the first database management module that provide input data for the computational task to provide identified first data containers;
  identifying a list of names of all second data containers mapped to the identified first data containers;
  computing a second query execution plan for the second stored procedure, by a second query optimizer in the second database management module, based at least in part on the first query execution plan and the list of names; and performing the second stored procedure in accordance with the second query execution plan.

2. The method of claim 1, wherein the first query execution plan resolves an unsynchronized first data container to a synchronized first data container from which the unsynchronized first data container is configured to retrieve input data.

3. The method of claim 1, wherein the first query execution plan triggers the second database management module to create a new second data container in accordance with information for an unsynchronized first data container in the first query execution plan, the new second data container being structurally identical to the unsynchronized first data container.

4. The method of claim 1, further comprising determining if a client system has all necessary privileges to access the identified first data containers and identifying a list of names of all second data containers in response to determining that the client system has all necessary privileges to access the identified first data containers.

5. The method of claim 4, further comprising terminating the method without identifying the list of names of the second data containers and without executing the second stored procedure in response to determining that client system does not have all necessary privileges to access the identified first data containers.

6. The method of claim 2, wherein the unsynchronized first data container comprises a view configured to retrieve data from a synchronized first data container.

7. The method of claim 1, further comprising triggering performance of the second stored procedure, in accordance with the second query execution plan, in response to having identified the list of names.

8. The method of claim 1, wherein the first and the second stored procedures respectively comprise a call to a user-defined function, the user-defined function being specified in SQL.

9. The method of claim 2, further comprising identifying, based at least in part on the first query execution plan, all first data containers that would be accessed upon executing the user-defined function, and thereby resolving any unsynchronized first data container specified in the user-defined function to a synchronized first data container from which the unsynchronized first data container is configured to retrieve input data.

10. The method of claim 2, further comprising identifying, based at least in part on the query execution plan, all first data containers that would be accessed upon executing the user-defined function, and thereby triggering the second database management module to create a new second data container in accordance with information on the unsynchronized first data container in the query execution plan, the new second data container being structurally identical to the unsynchronized first data container.

11. The method of claim 1, wherein:
the first query optimizer is configured for computing efficient query execution plans for tables in row-major order; and
the second query optimizer is configured for computing efficient query execution plans for tables in column-major order.

12. The method of claim 1, wherein the computational task is a k-means clustering algorithm.

* * * * *